United States Patent
Weidhaus et al.

(10) Patent No.: US 7,029,632 B1
(45) Date of Patent: Apr. 18, 2006

(54) RADIATION-HEATED FLUIDIZED-BED REACTOR

(75) Inventors: Dieter Weidhaus, Burghausen (DE); Alexander Hayduk, Gammelsdorf (DE)

(73) Assignee: Wacker-Chemie GmbH, Munich (DE)

( * ) Notice: Subject to any disclaimer, the term of this patent is extended or adjusted under 35 U.S.C. 154(b) by 926 days.

(21) Appl. No.: 09/677,347

(22) Filed: Oct. 2, 2000

(30) Foreign Application Priority Data

Oct. 6, 1999 (DE) ................................ 199 48 395

(51) Int. Cl.
*B01J 8/18* (2006.01)

(52) U.S. Cl. ................ 422/139; 422/146; 422/198; 165/177

(58) Field of Classification Search ................ 422/139, 422/140, 143, 145, 146, 198, 199, 202; 165/177, 165/178, 180, 185, 186
See application file for complete search history.

(56) References Cited

U.S. PATENT DOCUMENTS

| | | | |
|---|---|---|---|
| 4,786,477 A | 11/1988 | Yoon et al. | 422/145 |
| 4,967,486 A | 11/1990 | Doelling | 34/259 |
| 5,382,412 A | 1/1995 | Kim et al. | 422/142 |
| 5,810,934 A * | 9/1998 | Lord et al. | 118/725 |

FOREIGN PATENT DOCUMENTS

| | | |
|---|---|---|
| DE | 3638931 | 2/1987 |
| DE | 4327308 | 10/1997 |
| JP | 1-208311 | 8/1989 |
| WO | 96/41036 | 12/1996 |

OTHER PUBLICATIONS

D. Kunii, O. Levenspiel, Chapter 3, "Fluidization Engineering", $2^{nd}$ edition, 1991, Butterworth-Heinemann.

* cited by examiner

*Primary Examiner*—Alexa D. Neckel
(74) *Attorney, Agent, or Firm*—Collard & Roe, P.C.

(57) ABSTRACT

A radiation-heated fluidized-bed reactor and a process for producing high-purity polycrystalline silicon by using this reactor are provided. In this reactor, a heater device (14) is a radiation source for thermal radiation which is arranged outside the inner reactor tube and as a cylinder around the heater zone, without being in direct contact with the inner reactor tube. The inner reactor tube is designed in such a manner that it uses thermal radiation to heat the silicon particles in the heating zone to a temperature which is such that the reaction temperature is established in the reaction zone.

8 Claims, 2 Drawing Sheets

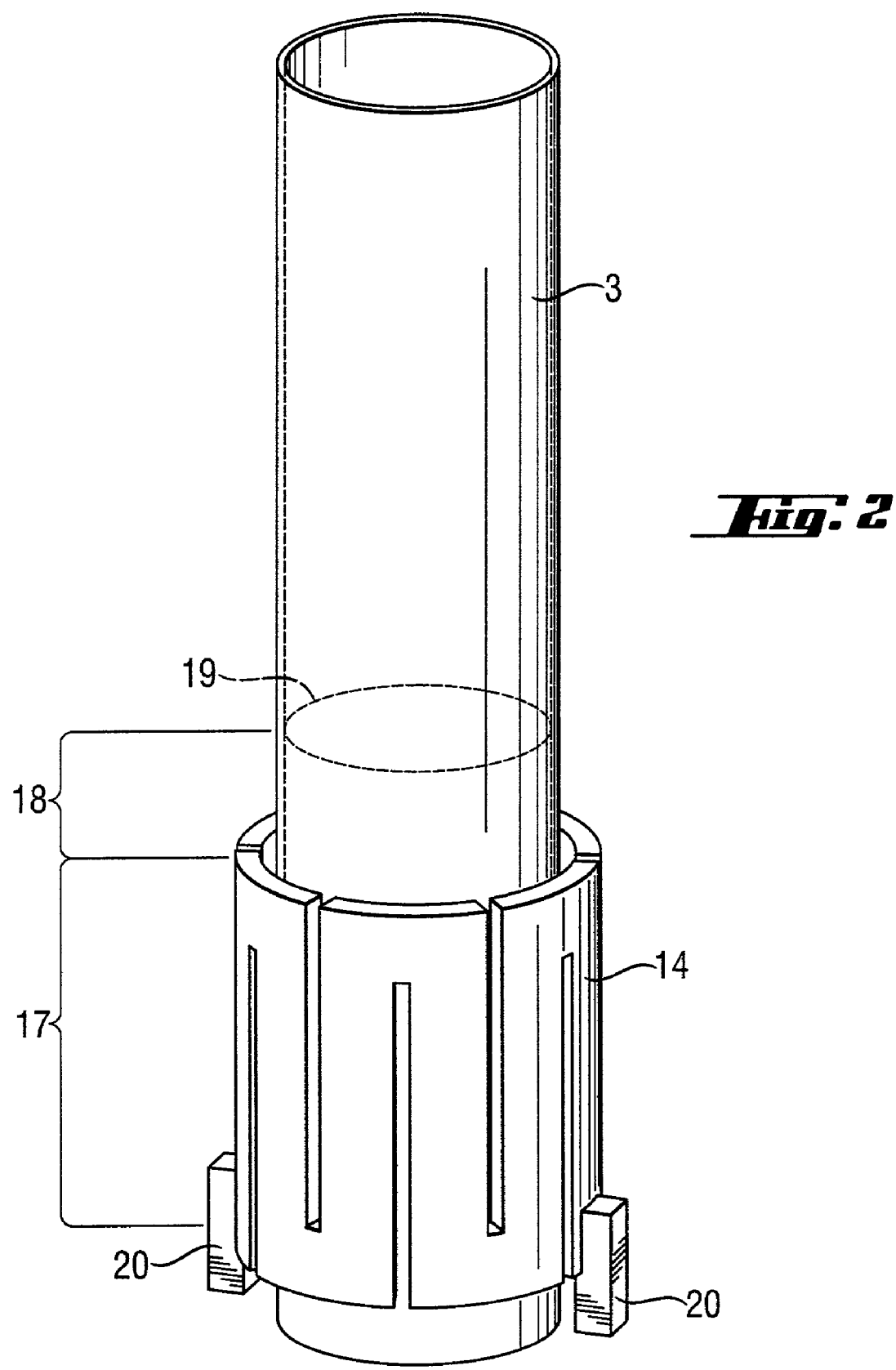

RADIATION-HEATED FLUIDIZED-BED REACTOR

BACKGROUND OF THE INVENTION

1. Field of the Invention

The present invention relates to a radiation-heated fluidized-bed reactor and to a process for producing high-purity polycrystalline silicon by means of this reactor.

2. The Prior Art

High-purity polycrystalline silicon is used, inter alia, as a starting material for the production of electronic components and solar cells. It is obtained by thermal decomposition of a silicon-containing gas or a silicon-containing gas mixture. This process is known as chemical vapor deposition (CVD). This process is carried out on a large scale in so-called Siemens reactors.

Recently, however, there have been wide-ranging efforts to utilize a fluidized-bed process as an alternative to the discontinuous Siemens process. In this case, a fluidized bed of silicon particles, for example approximately spherical particles with a diameter of 200 m–3000 µm is used. The particles are heated to the required deposition temperatures of preferably 600–1100° C., and a silicon-containing gas or gas mixture, for example trichlorosilane or a trichlorosilane/hydrogen mixture, is passed through the fluidized bed. In the process, elemental silicon is deposited on the silicon particles and the size of the individual particles grows. By regularly withdrawing grown particles and adding smaller silicon particles as seed particles, it is possible for the process to be operated continuously, with all the associated advantages.

A significant difficulty in the fluidized-bed process is the introduction of the energy in order for the fluidized bed to be operated at the high temperatures required, which are preferably between 600 and 1100° C. The deposition reaction is not selective with regard to the material of the solid surface, and the CVD reaction preferentially takes place on the hottest surface. If the energy is supplied to the fluidized bed by a wall heater system, the wall of the fluidized bed is the hottest surface in the reaction chamber and there is a correspondingly high deposition of silicon on this wall. As a result of silicon growing on continuously, this wall layer may considerably impair the heating, possibly even making it unable to function. Accordingly, various methods are known in the prior art aimed at avoiding this situation.

WO 96/41036 describes a process in which the energy is introduced through the gas supply by means of a highly bundled light beam. The light beam penetrates through the gas, is absorbed by the silicon particles and heats the latter. A drawback of this process is that only that area of the fluidized bed which is in the immediate vicinity of the entry of the silicon-containing gas is heated.

The heating of the fluidized bed by means of microwaves is known from DE 3638931 C2 (corresponds to U.S. Pat. No. 4,786,477). Microwaves are fed to the fluidized bed via a microwave-permeable fluidized-bed wall made from quartz. As a result, the particles are directly heated and are therefore hotter than the wall. However, since the wall/particles heat transfer ensures that the wall/particles temperature difference is only slight, in this case too there is undesirable deposition of silicon on the wall.

Therefore, in DE 4327308 C2 (corresponds to U.S. Pat. No. 5,382,412), microwave heating was developed further and the fluidized bed was vertically divided into a lower heating zone and a reaction zone situated above it. In the heating zone, the particles are fluidized by an inert gas, preferably hydrogen, and are heated by means of microwaves. As a result of particle and gas convection, the reaction zone above it is heated to the deposition temperature. The silicon-containing gas is initially added to the reaction zone via a nozzle. This is when the deposition reaction takes place. The heating zone itself remains free from wall deposition and the microwave heating is therefore not impaired even after prolonged operation.

However, the temperature-dependent way in which microwaves are introduced into silicon and the fact that the introduction of energy is dependent on the geometry of the reactor and the supply of microwaves, a reactor of this type leads to an energy supply which is uneven over a large area. In the specialist field, the resulting problem is known as hot spots/cold spots and is mentioned, for example, in U.S. Pat. No. 4,967,486 in connection with a microwave-heated fluidized bed. The result is that some silicon particles are excessively overheated and particles sinter together, and, in addition, relatively large particle agglomerates are formed in the fluidized bed. These silicon agglomerates are undesirable in the product and represent a considerable disruption to operation of the reactor, since they have relatively poor flow properties.

Also, particles were found to adhere to the fluidized-bed wall and were in some cases heated to such a point that they fused on (T>1400° C.). Moreover, the considerable overheating of particles in the immediate vicinity of the waveguide terminals leads to an excessive thermal load on the fluidized-bed walls. In combination, the drawbacks listed lead to unstable operation and an unsatisfactory product quality. Although the fluidizing of the fluidized bed and therefore the mixing behavior has a compensating effect in terms of the temperature distribution in the fluidized bed, this effect is highly dependent on the level of fluidization.

The higher the gas velocity, the stronger the vertical and horizontal mixing of particles. However, increasing the gas velocity to well beyond the fluidization velocity $u_{mf}$, characterized for example by equation (18) Chapter 3 in "*Fluidization Engineering*"; D. Kunii, O. Levenspiel; Butterworth-Heinemann; Second Edition 1991:

$$\frac{1.75}{\varepsilon_{mf}^3 \phi_s}\left(\frac{d_p u_{mf} \rho_g}{\mu}\right)^2 + \frac{150(1-\varepsilon_{mf})}{\varepsilon_{mf}^3 \phi_s^2}\left(\frac{d_p u_{mf} \rho_g}{\mu}\right) = \frac{d_p^3 \rho_g (\rho_s - \rho_g) g}{\mu^2}$$

where $\varepsilon_{mf}$ proportion of voids at the fluidization point $\phi_s$ sphericity of the particles $d_p$ particle diameter $\rho_g$ gas density $\rho_s$ solids density $\mu$ dynamic viscosity of the gas g acceleration due to gravity always leads to an increase in the energy supply required. This is because the fluidizing gas generally flows to the fluidized bed at a temperature which is significantly lower than that of the particles and is heated to approximately the temperature of the fluidized bed as it flows through the bed. Therefore, although an increase in the gas flow rate can counteract the formation of hot spots/cold spots, it always leads to an increased energy consumption by the process.

SUMMARY OF THE INVENTION

It is an object of the present invention to provide a fluidized-bed reactor in which the fluidized bed is heated in such a manner that it can be operated without problems for a prolonged period at the high temperatures required and will produce granules of high purity and with a low level of agglomerates.

The above object is achieved according to the present invention by means of a fluidized-bed reactor (1) which has:
a) a pressure-supporting enclosure (2);
b) an inner reactor tube (3) within said enclosure (2) and made from a material which exhibits high transmission for thermal radiation;
c) an inlet (4) at a top of said enclosure (2) for silicon particles (5);
d) an inlet device (6) for supplying a reaction gas (7) which contains a silicon compound in gas or vapor form;
the inlet device (6) being of tubular design and dividing the fluidized bed into a heating zone (17) and a reaction zone (18) situated above the heating zone;
e) a gas-distribution device (8) at a bottom of said enclosure (2); for feeding a fluidizing gas (9) into the heating zone;
f) an outlet (10) at the top of said enclosure (2) for reaction gas which has not fully reacted, fluidizing gas and the products of the reaction (11) which are in gas or vapor form and collect above the fluidized-bed surface (19);
g) an outlet (12) at the bottom of said enclosure (2) for the product (13);
h) a heater device (14);
i) an energy supply (15) for the heater device (14); and
wherein the heater device (14) is a radiation source for thermal radiation which is arranged outside the inner reactor tube and as a cylinder the heating zone (17), without being in direct contact with the inner reactor tube, and is designed in such a manner that it uses thermal radiation to heat the silicon particles in the heating zone to a temperature which is such that the reaction temperature is established in the reaction zone (18).

To reduce heat losses, the space between inner reactor tube (3) and pressure-supporting enclosure (2) is preferably provided with thermal insulation (16). A reactor of this type is shown in FIG. 1. It is particularly preferable to use inert material for the thermal insulation, in particular, for preference, quartz or a metal silicate.

Vertical separation into a heating zone and a reaction zone in a similar way to DE 4327308 C2 makes it possible for the fluidized bed to be heated using heating methods other than microwaves. This is because there cannot be any wall deposition in the heating zone, since there is no silicon-containing gas in that zone. However, this very point was not recognized in the patent DE 4327308 C2. In that document, very much to the contrary, heating methods other than microwave heating were in fact ruled out because of the expectation of wall deposition and because of materials and purity problems (cf. DE 4327308 C2, page 2, line 60 to page 3, line 22).

The combination according to the invention of using a thermal radiation heater with a vertical division of the fluidized bed into heating zone and reaction zone offers the following advantages:
a) The heat-transfer mechanism is self-stabilizing. This allows smooth and gentle operation for product and structural material of the fluidized-bed walls.
b) With large-area heater elements, the heat can be introduced with a high level of uniformity over the periphery of the fluidized bed and in a locally defined manner, and this in turn is beneficial to the structural material of the fluidized-bed walls.
c) Radiant heaters are heat sources which are of simple design and easy to operate.
d) Due to the temperature drop from the heater to the fluidized bed, only the net heat requirement, i.e. the heat which is needed in order to heat the gas from the inlet temperature to the temperature of the particles, has to be fed to the fluidized bed.
e) The heating zone can be operated with low fluidizing gas velocities, since there are no particle agglomerates formed even at low gas velocities.
f) Any desired materials can be used for insulation. Since the insulation material does not have to be microwave-permeable even in the heating zone, the choice of materials which can be used is significantly greater. It is preferable to use inert materials.
g) The vertical division into heating zone and reaction zone ensures that there is no wall deposition in the heating zone. This enables the radiant heater to be operated for a prolonged period without the heat transfer being impaired.

If the heating device is selected and arranged in accordance with the invention and the heater device and the material of the inner reactor tube are adapted to one another in such a way that the reactor tube exhibits a high level of transmission, preferably of greater than 80%, for the thermal radiation emitted by the heater the following result occurs. Most of the thermal radiation penetrates through the inner reactor tube and is directly absorbed by the silicon particles which are situated in the immediate vicinity of the wall in the heating zone. Consequently, the silicon particles in the fluidized bed can be directly heated with a very high level of uniformity over the periphery of the heating zone. Only a small proportion of the thermal radiation is absorbed by the reactor tube and heats the latter. Only this proportion of the heat transfer to the silicon particles takes place indirectly as if a wall heater was used.

With the radiant heating according to the invention, the fluidization velocity $u_{mf}$ only has to be exceeded slightly in the region of the heating zone in order for the reactor to be operated stably and continuously. This is because there is no need to compensate for any differing heat-introduction rates over the periphery, as occur, for example, with microwaves, by means of increased fluidization.

As can be seen from the examples, the heating using microwaves which is known in the prior art leads to sintering processes, the formation of agglomerates and product caking onto the inner side of the fluidized-bed walls in the heating zone.

Contrary to the statements given in DE 4327308, very good results are achieved with heating by means of thermal radiation and there are no materials problems or problems with wall deposition.

Preferably, the heater device is formed over a large area around the entire heating zone and thus forms a cylindrical radiation source. The result is a very uniform introduction of energy over the entire periphery of the heating zone.

Suitable heater devices are all devices which emit thermal radiation with a wavelength of from 0.4 μm to 900 μm, preferably a wavelength from 0.4 μm to 300 μm, particularly preferably infrared radiation with a wavelength of from 0.7 μm to 25 μm.

By way of example, the heater device may be heater elements made from doped silicon or graphite or silicon carbide, quartz tube radiators, ceramic radiators and wire radiators. The heater device preferably consists of a ceramic material or graphite, particularly preferably of graphite with a SiC surface coating.

Particularly preferably, the heater device (14) is a tube with meandering slots made from graphite with a SiC surface coating, which is arranged in the reactor standing on or hanging from the electrode terminals (20). Fiber-reinforced graphite is preferable. A heating device of this type is illustrated by way of example in FIG. 2.

The pressure-supporting enclosure is generally designed as a steel vessel.

To achieve a high level of product purity, all components of the reactor which come into contact with product should preferably consist of inert materials, for example silicon, quartz or a ceramic, or should be coated with such materials.

Inert materials are intended to mean materials which do not contaminate the product in the reactor under reaction conditions. Particularly suitable materials for this purpose are silicon or quartz.

Moreover, the inner reactor tube must in every case exhibit a high transmission for the thermal radiation which is emitted by the heater selected. For example, in the case of quartz glass of suitable quality, the transmission for infrared radiation with wavelengths of lower than 2.6 µm is greater than 90%. Therefore, quartz is particularly suitable in combination with a light infrared-emitting heater (range from 0.7 to 2.5 µm), for example a radiator with a SiC surface, from which a maximum wavelength of the radiation emitted is 2.1 µm.

The gas-distribution device (8) is preferably formed from porous inert material or from solid inert material which is provided with individual openings for distributing the fluidizing gas.

The present invention also relates to a process for producing high-purity polycrystalline silicon in a fluidized bed using a reactor according to the invention.

In the process according to the invention, high-purity polycrystalline silicon is produced by deposition of a reaction gas above a reaction temperature on silicon particles in a fluidized bed which is vertically divided into a heating zone and a reaction zone. A fraction of the silicon particles are fluidized in the heating zone with the aid of a silicon-free fluidizing gas and are heated to above the reaction temperature. The heated silicon particles, in an upper region of the heating zone, are mixed with the silicon particles from the reaction zone with the heat from the heating zone being transmitted to the reaction zone. In the reaction zone, the reaction gas, containing a silicon compound in gas or vapor form, is deposited on the silicon particles as metallic silicon at the reaction temperature. The particles which have been provided with the deposited silicon as well as the reaction gas which does not react, the fluidizing gas and the gaseous by-products of the reaction are removed from the reactor. Thus the silicon particles are heated to the reaction temperature in the heating zone by means of thermal radiation.

The fluidizing gas may, for example, be hydrogen. The reaction gas which contains a silicon compound in gas or vapor form is, for example, monosilane or a chlorosilane compound or a monosilane/hydrogen or a chlorosilane/hydrogen mixture, preferably trichlorosilane or a trichlorosilane/hydrogen mixture.

Particle and gas convection means that the particle temperatures in the heating zone and reaction zone are brought into line with one another, so that the temperature in the reaction zone can be controlled by heating the heating zone.

The temperature of the silicon particles in the reaction zone is preferably between 6000 and 1100° C., particularly preferably between 800° and 1100° C.

The pressure in the fluidized bed is preferably between 0 and 10 bar excess pressure, particularly preferably between 0 and 6 bar excess pressure.

The particles in the heating zone are heated by means of thermal radiation with a wavelength of between 0.4 and 9000 µm, and preferably near infrared radiation with a wavelength of from 0.7 to 25 µm. The thermal energy is introduced uniformly over the periphery of the fluidized bed, preferably by means of large-area radiant heaters.

Since the silicon particles have little tendency to form agglomerates (no overheating and no silicon-containing gas present), the velocity of the fluidizing gas in the heating zone can be set at close to the fluidization velocity $u_{mf}$, in particular at 1 to 2 times the fluidization velocity $u_{mf}$.

In the reaction zone, the silicon-containing gas can be broken down at the surface of the hot particles and elemental silicon grows onto the particles. The particles in the fluidized bed are of approximately spherical shape and have a mean grain diameter of 200–3000 µm, preferably of 500 to 1500 µm.

By regularly extracting particles from the fluidized bed and adding small seed particles, it is possible for the process to be operated continuously.

The device and method are preferably used for the deposition of high-purity polycrystalline silicon as starting material for the production of electronic components and solar cells.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 2 shows a heating device for use with the fluidized-bed reactor of the invention.

DETAILED DESCRIPTION OF PREFERRED EMBODIMENTS

Figure 1:
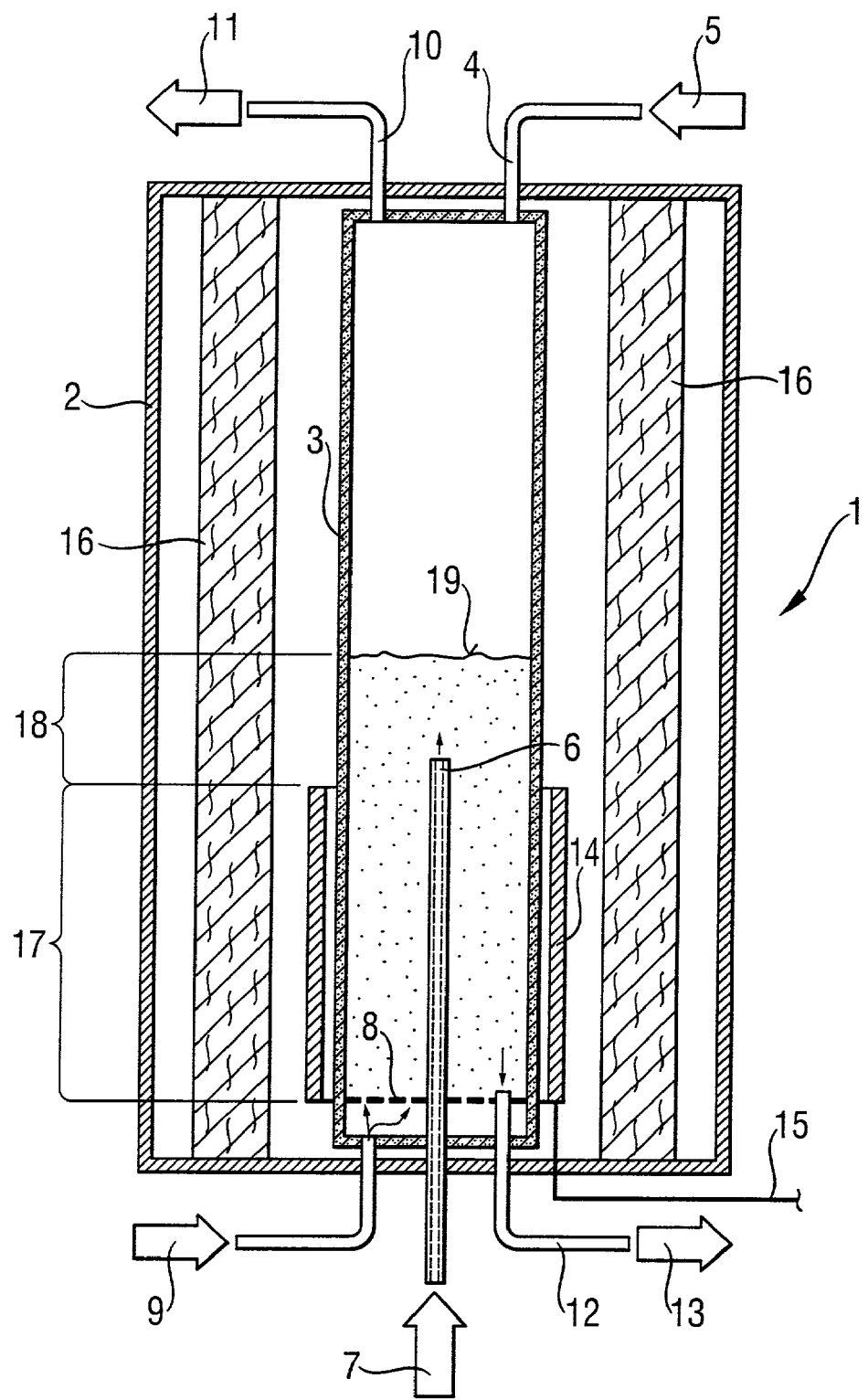
FIG. 1 shows a fluidized-bed reactor according to the invention.

The following examples serve to further explain the invention.

COMPARATIVE EXAMPLES

A reactor which was known from the prior art was constructed as follows:

In a pressure-resistant steel vessel with an internal diameter of 450 mm is situated the inner reactor tube, a quartz tube with an internal diameter of 200 mm and a length of 2000 mm. At the bottom end of the quartz tube, a quartz panel forms the gas distributor for the fluidizing gas. A further quartz tube with an internal diameter of 10 mm and a length of 450 mm projects through the center of the gas distribution panel into the inner reactor tube, for supplying the silicon-containing gas or gas mixture, and at the same time forms the device for separating the fluidized bed into heating zone and reaction zone.

Furthermore, the quartz panel is provided with an opening for product removal. Steel jacket and upper end of the reactor are provided with openings for adding seed particles and for discharging the off-gas.

200 mm above the gas distribution panel, the steel jacket has two opposite openings for supplying microwave energy which is guided from a microwave generator to the reactor by means of waveguides. The generator supplies a maximum of 38 kW microwave output at a frequency of 915 MHz. A pyrometer is used for the temperature measurement, measuring the particle temperature at the top of the fluidized bed as a representative value for the reaction zone.

For insulation purposes, the space between inner reactor tube and steel jacket is filled with quartz wool. For all the examples, a starting fill with approximately the same grain size distribution of from 200 μm to 1100 μm and a mean grain diameter of 550 μm was used.

Comparative Example 1

To test the microwave heating, the inner reactor tube was filled with 24 kg of silicon particles.
The following conditions were established:

| | |
|---|---|
| Fluidizing gas hydrogen | 13.5 m$^3$/h (s.t.p.) |
| Fluidizing gas inlet temperature | 120° C. |
| No reaction gas added | |
| Temperature of the reaction zone: | 920° C. |
| Pressure in the reaction zone: | 1250 kPa (absolute) |
| Heating capacity: | 13.9 kW |

The fluidized bed was operated at approx. 1.5 times the fluidization velocity $u_{mf}$.

After operation for 24 hours under the above conditions, the silicon particles were removed from the fluidized bed and the grain size distribution was analyzed. Sintering processes and the formation of agglomerates meant that the mean grain size had risen to 720 m. The size of the agglomerates was up to 4 mm. Moreover, there were numerous particles caked onto the inner side of the inner reactor tube.

Comparative Example 2

The inner reactor tube was once again filled with 24 kg of silicon particles.
The following conditions were established:

| | |
|---|---|
| Fluidizing gas hydrogen | 22.5 m$^3$/h (s.t.p.) |
| Fluidizing gas inlet temperature | 120° C. |
| No reaction gas added | |
| Temperature of the reaction zone: | 920° C. |
| Pressure in the reaction zone: | 1250 kPa (absolute) |
| Heating capacity: | 16.5 kW |

This time, the fluidized bed was operated at approx. 2.5 times the fluidization velocity $u_{mf}$.

After operation for 24 hours under the above conditions, the silicon particles were again removed from the fluidized bed and the grain size distribution was analyzed. Sintering processes and the formation of agglomerates meant that the mean grain size had once again risen. This time, the mean grain diameter was 610 m. This time, the inner side of the quartz tube exhibited considerably fewer caked-on particles.

EXAMPLES (INVENTION)

The reactor was rebuilt for the following tests. Instead of the microwave heating, a radiant heater was fitted as the source of thermal radiation. This heater was a tube with meandering slits made from graphite with a SiC surface coating, which surrounded the inner reactor tube in the region of the heating zone without coming into contact with the latter. The radiant heater was supplied with electric power via a controllable voltage source. Its maximum output was 40 kW.

Example 1

The procedure was similar to Comparative Example 1. The starting fill was once again 24 kg.
The following conditions were established:

| | |
|---|---|
| Fluidizing gas hydrogen | 13.5 m$^3$/h (s.t.p.) |
| Fluidizing gas inlet temperature | 120° C. |
| No reaction gas added | |
| Temperature of the reaction zone: | 920° C. |
| Pressure in the reaction zone: | 1250 kPa (absolute) |
| Heating capacity: | 12.5 kW |

As in Example 1, the fluidized bed was operated for 24 hours at approx. 1.5 times the fluidization velocity $u_{mf}$. The grain size analysis of the particles which were then removed revealed a mean grain diameter of 565 μm. No sintered-together agglomerates were found. The inner side of the reactor tube was completely free of deposits.

Example 2

In this example, it was demonstrated that the process is suitable for the production of high-purity silicon. For this purpose, the arrangement with the radiant heater was used once again. The inner reactor tube was filled with 28 kg of silicon particles, once again with a mean grain size of 550 μm.

The following conditions were established:

| | |
|---|---|
| Fluidizing gas: hydrogen | 27 m$^3$/h (s.t.p.) |
| Reaction gas: | |
| Trichlorosilane | 30 kg/h |
| Hydrogen | 3.6 m$^3$/h (s.t.p.) |
| Inlet temperature of the gases: | 120° |
| Temperature of the reaction zone: | 920° C. |
| Pressure in the reaction zone: | 1250 kPa (absolute) |
| Net energy demand: | 37.5 kW |
| Addition of silicon particles (250 μm) | 0.05 kg/h |

The reactor was operated for 7 days at this setting. Product was removed every half hour, resulting in a mean production rate of 1.27 kg/h. The mean diameter of the product was 780 μm, and the product was free of agglomerates. After the end of the test, the inner side of the reactor tube in the region of the heating zone was completely free of wall deposition and caked-on product.

Accordingly, while a few embodiments of the present invention have been shown and described, it is to be understood that many changes and modifications may be made thereunto without departing from the spirit and scope of the invention as defined in the appended claims.

What is claimed is:

1. A fluidized-bed reactor (1) comprising:
    a) a pressure-supporting enclosure (2);
    b) an inner reactor tube (3) within said enclosure (2) and made from a material which exhibits high transmission for thermal radiation;
    c) an inlet (4) at a top of said enclosure (2) for silicon particles (5);
    d) an inlet device (6) for supplying a reaction gas (7) which contains a silicon compound in gas or vapor form, the inlet device (6) being of tubular design and dividing the fluidized bed into zones consisting of a heating zone (17) and a separate reaction zone (18) situated above the heating zone, wherein the inlet device is positioned so that the reaction gas supplied by the inlet device does not enter the heating zone;
    e) a gas-distribution device (8) at a bottom of said enclosure (2) for feeding a fluidizing gas (9) into the heating zone;
    f) an outlet (10) at the top of said enclosure (2) for reaction gas which has not fully reacted, fluidizing gas and products of reaction (11) which are in gas or vapor form and collect above a fluidized-bed surface (19);
    g) an outlet (12) at the bottom of said enclosure (2) for a product (13);
    h) a heater device (14);
    i) an energy supply (15) for the heater device (14); and
    wherein the heater device (14) is a radiation source for thermal radiation which is arranged outside the inner reactor tube and as a cylinder around the heating zone (17), without being in direct contact with the inner reactor tube, and is designed in such a manner that it uses thermal radiation to heat the silicon particles in the heating zone to a temperature which is such that the reaction temperature is established in the reaction zone (18).

2. The fluidized-bed reactor as claimed in claim 1, wherein a space between said inner reactor tube (3) and said pressure-supporting enclosure (2) is provided with thermal insulation (16).

3. The fluidized-bed reactor as claimed in claim 1, wherein the heater device is formed over a large area around the entire heating zone and thus forms a cylindrical radiation source.

4. The fluidized-bed reactor as claimed in claim 1, wherein the heater device emits thermal radiation with a wavelength of from 0.4 µm to 900 µm.

5. The fluidized-bed reactor as claimed in claim 4, wherein the heater device emits thermal radiation with a wavelength of from 0.4 µm to 300 µm.

6. The fluidized-bed reactor as claimed in claim 1, wherein the heater device is selected from the group consisting of a heater element made from doped silicon, a heater element made from graphite, a heater element made from silicon carbide, a quartz tube radiator, a ceramic radiator and a wire radiator.

7. The fluidized-bed reactor as claimed in claim 1, wherein all components of the reactor which come into contact with product are selected from the group consisting of an inert material and a component coated with an inert material.

8. A fluidized-bed reactor (1) comprising:
    (a) a pressure supporting enclosure (2);
    (b) an inner reactor tube (3) within said enclosure (2) and made from a material which exhibits high transmission for thermal radiation;
    (c) an inlet (4) at a top of said enclosure (2) for silicon particles (5)
    (d) an inlet device (6) for supplying a reaction gas (7) which contains a silicon compound in gas or vapor form, the inlet device (6) being of tubular design and dividing the fluidized bed into a heating zone (17) and a reaction zone (18) situated above the heating zone;
    (e) a gas-distribution device (8) at a bottom of said enclosure (2) for feeding a fluidizing gas (9) into the heating zone;
    (f) an outlet (10) at the top of said enclosure (2) for reaction gas which has not fully reacted, fluidizing gas and products of reaction (11) which are in gas or vapor form and collect above a fluidized-bed surface (19);
    (g) an outlet (12) at the bottom of said enclosure (2) for a product (13);
    (h) a heater device (14);
    (i) an energy supply (15) for the heater device (14); and
    wherein the heater device (14) is a radiation source for thermal radiation which is arranged outside the inner reactor tube and as a cylinder around the heating zone (17), without being in direct contact with the inner reactor tube, and is designed in such a manner that it uses thermal radiation to heat the silicon particles in the heating zone to a temperature which is such that the reaction temperature is established in the reaction zone (18) and wherein the heater device is a tube with meandering slots made from graphite with a SiC surface coating which is arranged in the reactor, standing on or hanging from electrode terminals.

* * * * *